United States Patent
Kum et al.

(10) Patent No.: US 11,433,884 B2
(45) Date of Patent: Sep. 6, 2022

(54) LANE-BASED PROBABILISTIC MOTION PREDICTION OF SURROUNDING VEHICLES AND PREDICTIVE LONGITUDINAL CONTROL METHOD AND APPARATUS

(71) Applicant: Korea Advanced Institute of Science and Technology, Daejeon (KR)

(72) Inventors: Dongsuk Kum, Daejeon (KR); Seung Je Yoon, Daejeon (KR); Jaehwan Kim, Daejeon (KR); Sanmin Kim, Daejeon (KR)

(73) Assignee: Korea Advanced Institute of Science and Technology

(*) Notice: Subject to any disclaimer, the term of this patent is extended or adjusted under 35 U.S.C. 154(b) by 201 days.

(21) Appl. No.: 16/521,990

(22) Filed: Jul. 25, 2019

(65) Prior Publication Data

US 2020/0172093 A1    Jun. 4, 2020

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 50/0097* (2013.01);
(Continued)

(58) Field of Classification Search
CPC ............. B60W 30/09; B60W 30/0956; B60W 50/0097; B60W 2556/00; B60W 40/06;
(Continued)

(56) References Cited

U.S. PATENT DOCUMENTS

2018/0061253 A1*   3/2018  Hyun ............... G08G 1/166
2019/0179328 A1*   6/2019  Movert ............. G06F 16/29
(Continued)

FOREIGN PATENT DOCUMENTS

JP   2010-023721    2/2010
KR   10-0776860    11/2007
(Continued)

OTHER PUBLICATIONS

Korean Office Action issued in corresponding Korean Application No. 10-2018-0150424 dated Jan. 2, 2020.

*Primary Examiner* — Hunter B Lonsberry
*Assistant Examiner* — Jimin You
(74) *Attorney, Agent, or Firm* — Grogan, Tuccillo & Vanderleeden LLP

(57) ABSTRACT

Disclosed are probabilistic prediction for a motion of a lane-based surrounding vehicle and a longitudinal control method and apparatus using the same. The method includes obtaining surrounding vehicle information using a sensor, predicting a target lane of the surrounding vehicle based on the obtained surrounding vehicle information, performing future driving trajectory prediction for each target lane based on the surrounding vehicle information, and computing a probability of a collision likelihood based on a target lane and trajectory predictions of the surrounding vehicle in which future uncertainty has been taken into consideration and performing longitudinal control for collision avoidance.

16 Claims, 9 Drawing Sheets

(51) Int. Cl.
- *B60W 50/00* (2006.01)
- *G05D 1/00* (2006.01)
- *G06N 3/04* (2006.01)
- *G05B 13/02* (2006.01)

(52) U.S. Cl.
CPC ......... *G05B 13/027* (2013.01); *G05D 1/0088* (2013.01); *G06N 3/0472* (2013.01); *B60W 2050/0028* (2013.01); *B60W 2554/80* (2020.02); *B60W 2556/00* (2020.02); *B60W 2720/106* (2013.01); *G05D 2201/0213* (2013.01)

(58) Field of Classification Search
CPC .. B60W 40/105; B60W 40/107; B60W 30/14; B60W 2552/00; B60W 2554/80; B60W 60/0027; B60W 2520/105; B60W 30/095; B60W 2050/0028; B60W 2720/106; G06N 3/0472; G06N 7/005; G06N 20/00; B60Y 2300/095; G05D 1/0088; G05D 2201/0213; G05D 1/0289; G05B 13/027

See application file for complete search history.

(56) References Cited

U.S. PATENT DOCUMENTS

2019/0291726 A1* 9/2019 Shalev-Shwartz .......................... B60W 50/087
2019/0329771 A1* 10/2019 Wray .............. B60W 30/18163

FOREIGN PATENT DOCUMENTS

| KR | 10-1371275 | 3/2014 |
| KR | 10-1610544 | 4/2016 |
| KR | 10-1795251 | 11/2017 |
| KR | 10-2018-0025587 | 3/2018 |

* cited by examiner

FIG. 7

$$\min J(X, U) = (Y - v_{des})^T Q(Y - v_{des}) + U^T RU \quad (1)$$

$$\text{s.t} \quad X = S_x X_k + S_u U \quad (2)$$

$$u_{min} \leq u_k \leq u_{max} \quad (3)$$

$$\Delta u_k \leq \Delta u_{max} \quad (4)$$

$$P(G(X_k) + h_k \leq 0) \ 1- \geq \epsilon \quad (5)$$

LANE-BASED PROBABILISTIC MOTION PREDICTION OF SURROUNDING VEHICLES AND PREDICTIVE LONGITUDINAL CONTROL METHOD AND APPARATUS

CROSS REFERENCE TO RELATED APPLICATION

This application is based on and claims priority under 35 U.S.C. 119 to Korean Patent Application No. 10-2018-0150424, filed on 29 Nov. 2018, in the Korean Intellectual Property Office, the disclosures of which is herein incorporated by reference in their entireties.

BACKGROUND OF THE INVENTION

1. Technical Field

The present invention relates to probabilistic prediction for a motion of a lane-based surrounding vehicle and a longitudinal control method and apparatus using the same. More particularly, the present invention relates to probabilistic prediction for a motion of a surrounding vehicle in an autonomous driving vehicle and a driver assistance system and a longitudinal control method using the same.

2. Description of the Related Art

Recently, as research is actively carried out on intelligent vehicle technologies, such as autonomous driving and a driver assistance system (DAS), research of motion prediction for a surrounding vehicle becomes important in order to secure the stability of an autonomous driving vehicle and to make a driving trajectory plan. However, the safe driving of an autonomous driving vehicle and a collision avoidance technology are not reliable due to low prediction accuracy of the existing prediction technologies.

In order to solve such problems, probabilistic prediction in which uncertainty has been taken into consideration with respect to a motion of a surrounding vehicle is essential. There is a need for an algorithm for probabilistically predicting the target lane and trajectory predictions of a surrounding vehicle using an artificial neural network.

Furthermore, if the prediction of a motion of a surrounding vehicle is output as a probabilistic result value, the probabilistic result value is not properly incorporated into most of control algorithms. Accordingly, there is a need for a longitudinal vehicle control algorithm capable of computing a collision avoidance probability using a probabilistic prediction result value for a surrounding vehicle in which uncertainty has been taken into consideration.

SUMMARY OF THE INVENTION

Embodiments of the present invention provide an algorithm for probabilistically predicting the target lane and trajectory predictions of a surrounding vehicle using probabilistic motion prediction in which uncertainty has been taken into consideration with respect to a motion of the surrounding vehicle, that is, an artificial neural network. Furthermore, embodiments propose a longitudinal vehicle control algorithm capable of computing a collision avoidance probability using a probabilistic prediction result value for a surrounding vehicle in which uncertainty has been taken into consideration.

In an aspect, probabilistic prediction for a motion of a lane-based surrounding vehicle and a longitudinal control method using the same includes obtaining surrounding vehicle information using a sensor, predicting a target lane of the surrounding vehicle based on the obtained surrounding vehicle information, performing future driving trajectory prediction for each target lane based on obtained surrounding vehicle information, and computing a probability of a collision likelihood based on a target lane and trajectory predictions of the surrounding vehicle in which future uncertainty has been taken into consideration and performing longitudinal control for collision avoidance.

Predicting the target lane of the surrounding vehicle includes using an artificial neural network structure in which current and past time-series position information and road information of the surrounding vehicle for a predetermined time are used as input values, and outputting a probability of the target lane as an output value.

Predicting the target lane of the surrounding vehicle may be performed using Interacting Multiple Model, or Markov Chain in addition to an artificial neural network structure.

Performing the driving trajectory prediction and probability transform through an artificial neural network structure includes using an artificial neural network structure in which a probability of the target lane is used, the longitudinal/lateral positions are used as input values, the longitudinal/lateral positions are output as output values, and a longitudinal/lateral positions trajectory and probability distribution are finally output as output values through a process of transforming the output values, output as the longitudinal/lateral positions, into a probability.

Performing the driving trajectory prediction may be performed using Polynomial fitting using the artificial neural network position outputs. For example, in driving trajectory prediction using polynomial fitting, when a target lane is simply determined, a trajectory may be generated using the current location of the corresponding lane and the center line of the target lane as a polynomial expression.

Performing the longitudinal control for collision avoidance using a probabilistic result value for a collision likelihood includes performing optimal longitudinal control using a cost function to minimize a difference between a longitudinal target velocity and a current velocity and target acceleration so that a collision probability does not exceed a predetermined value and the cost function is minimized.

Longitudinal control in which uncertainty for a collision has been taken into consideration is performed using longitudinal safety distance restriction between an ego vehicle and the surrounding vehicle in a chance-constraint form through probabilistic motion prediction for a motion of the surrounding vehicle. A desired driving style of the automated driving algorithm is adjusted by controlling a chance-constraint parameter.

In another aspect, an apparatus for controlling a ego vehicle using prediction for a motion of a surrounding vehicle includes a sensor configured to obtain surrounding vehicle information using a sensor, a prediction unit configured to predict a target lane of the surrounding vehicle based on the obtained surrounding vehicle information, a probability calculation unit configured to perform future driving trajectory prediction for each target lane based on obtained surrounding vehicle information, and a longitudinal controller configured to compute a probability of a collision likelihood based on a target lane and trajectory predictions of the surrounding vehicle in which future uncertainty has been taken into consideration and perform longitudinal control for collision avoidance.

In another aspect, a longitudinal control method using lane-based probabilistic prediction for a motion of a surrounding vehicle includes obtaining surrounding vehicle information using a sensor, predicting a target lane of the surrounding vehicle based on the obtained surrounding vehicle information using an artificial neural network structure, performing future driving trajectory prediction for each target lane based on the obtained surrounding vehicle information, and computing a cost function to minimize a difference between a longitudinal target velocity and a current velocity and target acceleration using the predicted target lane and driving trajectory predictions of the surrounding vehicle and performing optimal longitudinal control so that a collision probability does not exceed a predetermined value and the cost function is minimized.

In another aspect, a longitudinal control apparatus includes a sensor configured to obtain surrounding vehicle information using a sensor, a prediction unit configured to predict a target lane of the surrounding vehicle based on the obtained surrounding vehicle information using an artificial neural network structure, a probability calculation unit configured to perform future driving trajectory prediction for each target lane based on the obtained surrounding vehicle information, and a predicted target lane and driving trajectory predictions of the surrounding a longitudinal controller configured to compute a cost function to minimize a difference between a longitudinal target velocity and a current velocity and target acceleration using the predicted target lane and driving trajectory predictions of the surrounding vehicle and perform optimal longitudinal control so that a collision probability does not exceed a predetermined value and the cost function is minimized.

BRIEF DESCRIPTION OF THE DRAWINGS

FIG. 7 is an equation showing the definition of a cost function and a restriction condition for model predictive control according to an embodiment of the present invention.

DETAILED DESCRIPTION

Hereinafter, embodiments of the present invention are described in detail with reference to the accompanying drawings.

Figure 1:
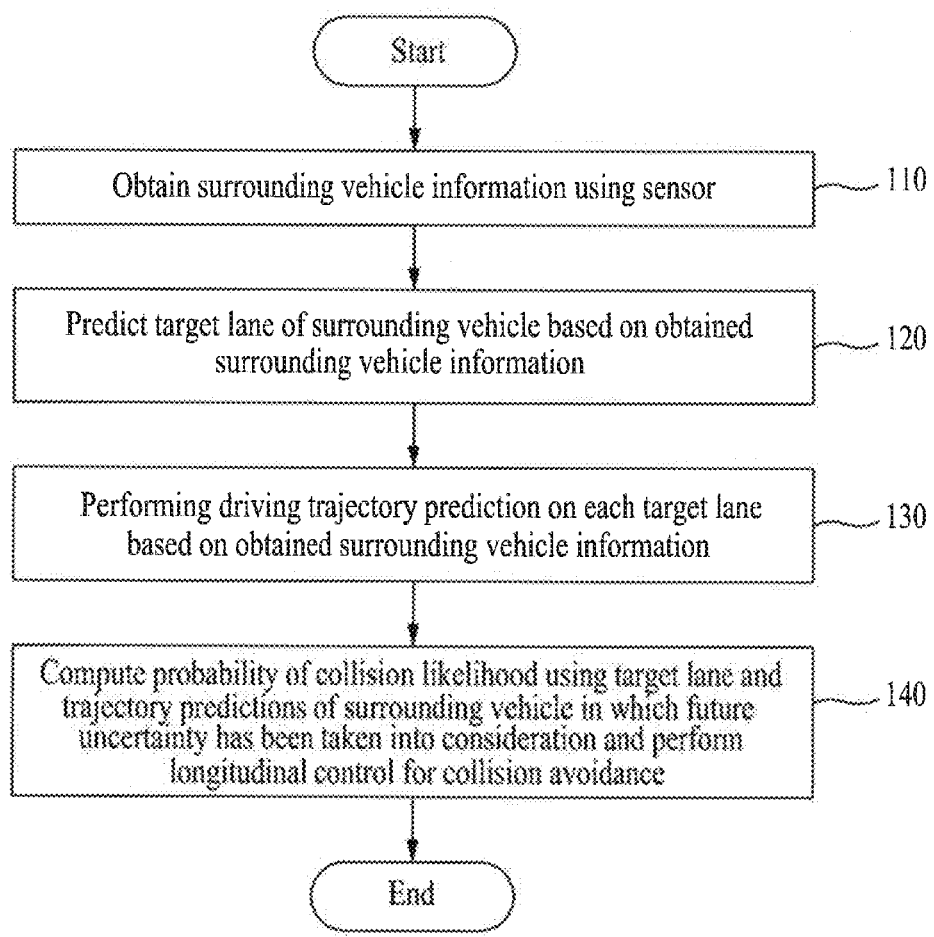
FIG. 1 is a flowchart illustrating a probabilistic prediction for a motion of a lane-based surrounding vehicle and longitudinal control method using the same according to an embodiment of the present invention.

FIG. 1 is a flowchart illustrating a probabilistic prediction for a motion of a lane-based surrounding vehicle and longitudinal control method using the same according to an embodiment of the present invention.

A proposed probabilistic prediction for a motion of a lane-based surrounding vehicle and longitudinal control method using the same includes step 110 of obtaining surrounding vehicle information using a sensor, step 120 of predicting a target lane of the surrounding vehicle based on the obtained surrounding vehicle information, step 130 of performing future driving trajectory prediction for each target lane based on the obtained surrounding vehicle information, and step 140 of computing the probability of a collision likelihood using the target lane and trajectory predictions of the surrounding vehicle in which future uncertainty has been taken into consideration and performing longitudinal control for collision avoidance.

At step 110, surrounding vehicle information is obtained using the sensor.

At step 120, a target lane of the surrounding vehicle is predicted based on the obtained surrounding vehicle information. In this case, an artificial neural network structure in which current and past time-series position information and road information of the surrounding vehicle for a predetermined time are used as input values may be used. Furthermore, a probability of the target lane is output as an output value. A method of predicting the target lane may be performed using probability models, such as Interacting Multiple Model or Markov Chain and Gaussian distribution, in addition to the artificial neural network structure.

At step 130, driving trajectory prediction is performed on each target lane based on the obtained surrounding vehicle information. An artificial neural network structure using the current and past time-series longitudinal/lateral positions and/or velocity of the surrounding vehicle for a predetermined time as an input value is used. The longitudinal/lateral positions are output as an output value. In this process, different artificial neural networks are used for the longitudinal and position directions. Furthermore, a probability of the longitudinal/lateral positions is output as the final output value through a process of transforming the deterministic prediction output value into a probabilistic prediction output values. A method of predicting the driving trajectory may be performed using driving trajectory prediction using an artificial neural network structure or a polynomial expression. For example, in driving trajectory prediction using polynomial fitting, when a target lane is simply determined, a trajectory may be generated using a polynomial expression based on the current location of the corresponding lane and the center line of the target lane.

At step 140, a probability of a collision likelihood is computed using the target lane and trajectory predictions of the surrounding vehicle in which future uncertainty has been taken into consideration, and longitudinal control for collision avoidance is performed. In this case, optimal longitudinal control is performed using a cost function that minimizes a difference between a longitudinal target velocity and a current velocity and target acceleration so that a collision probability does not exceed a predetermined value and the cost function is minimized.

Longitudinal control in which the uncertainty of a collision has been taken into consideration can be performed using longitudinal safety distance restriction between an ego vehicle and a surrounding vehicle in a chance-constraint form through probabilistic motion prediction for a motion of the surrounding vehicle. Furthermore, the desired driving style of the automated driving algorithm is adjusted by controlling a chance-constraint parameter.

Figure 2:
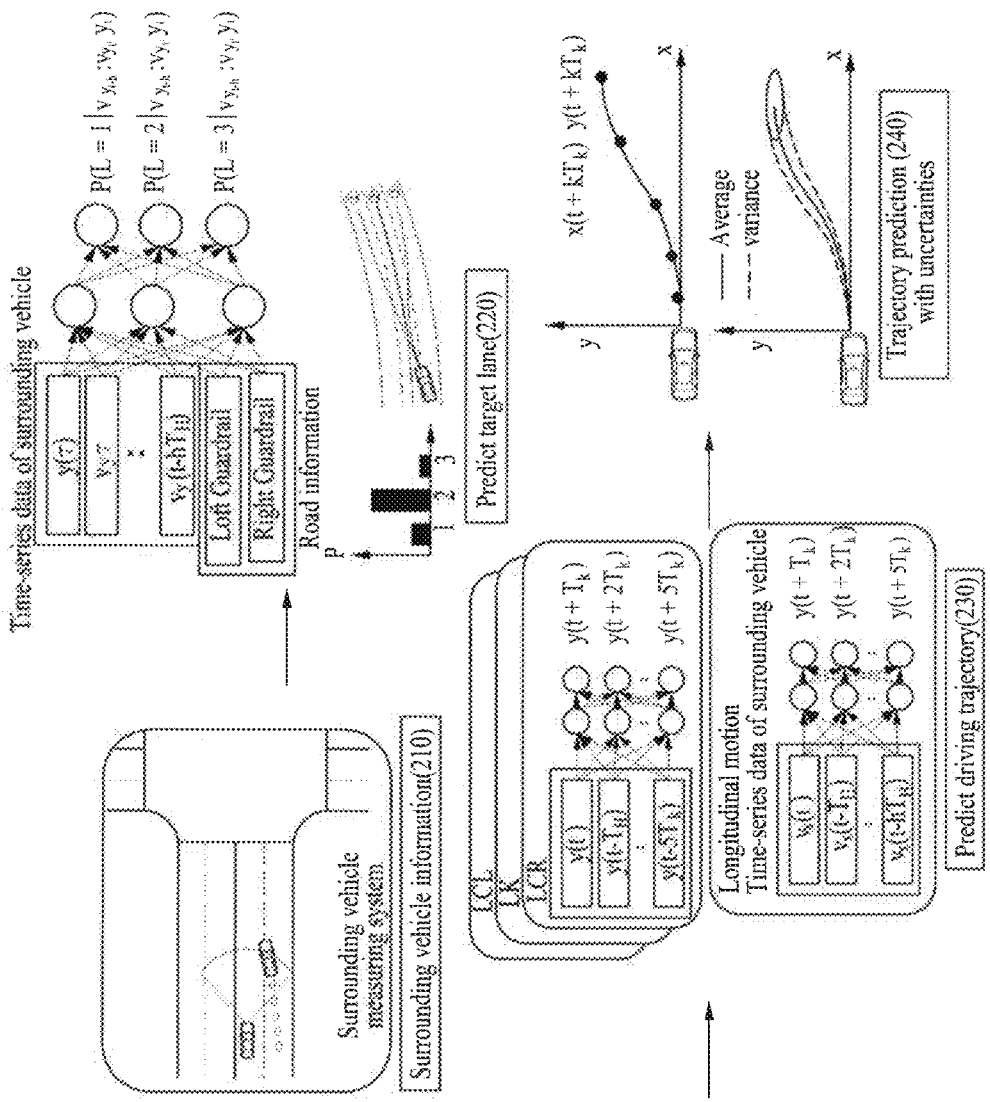
FIG. 2 is a diagram illustrating lane-based probabilistic prediction for a motion of a surrounding vehicle using an artificial neural network according to an embodiment of the present invention.

FIG. 2 is a diagram illustrating lane-based probabilistic prediction for a motion of a surrounding vehicle using an artificial neural network according to an embodiment of the present invention.

As shown in FIG. 2, there is proposed an algorithm for predicting the target lane and driving trajectory predictions of a surrounding vehicle over an artificial neural network using information on the surrounding vehicle, which is sequentially obtained through the sensor, and changing the result of the prediction into a probabilistic result value.

Surrounding vehicle information (210) is obtained through the sensor. The target lane of the surrounding vehicle is predicted (220) based on the obtained surrounding vehicle information. Driving trajectory prediction (230) is performed on each target lane using the obtained surrounding vehicle information. In this case, an artificial neural network structure in which current and past time-series position information and road information of the surrounding vehicle for a predetermined time are used as input values may be used. Furthermore, an artificial neural network structure in which the current and past longitudinal locations of the surrounding vehicle for a predetermined time are used as a time-series input value and a future longitudinal location for a predetermined time is used as an output value may be used. Thereafter, a probability of a collision likelihood may be computed using the target lane and trajectory predictions of the surrounding vehicle in which future uncertainty has been taken into consideration. Longitudinal control for collision avoidance may be performed (240).

Figure 3:
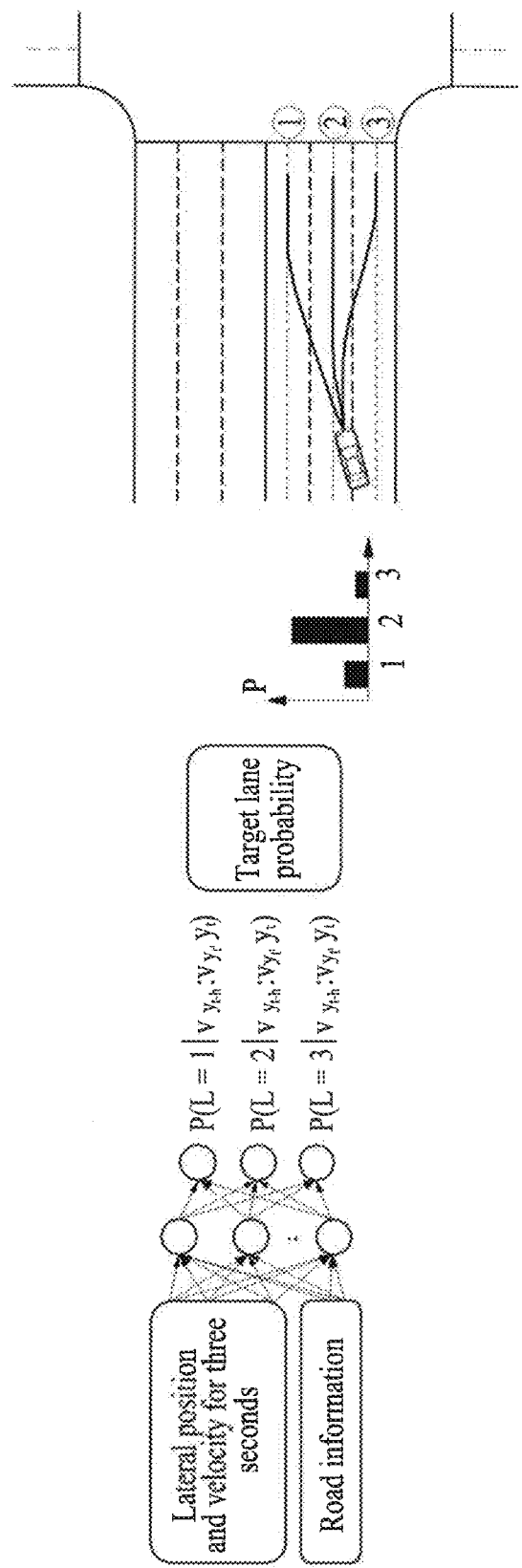
FIG. 3 is a diagram illustrating the structure of an artificial neural network for target lane prediction and the target lane and probability of a surrounding vehicle according to an embodiment of the present invention.

FIG. 3 is a diagram illustrating the structure of an artificial neural network for target lane prediction and the target lane and probability of a surrounding vehicle according to an embodiment of the present invention.

As shown in FIG. 3, an artificial neural network structure in which current and past time-series location and road information of a surrounding vehicle for a predetermined time are used as input values may be used. According to an embodiment of the present invention, an artificial neural network structure in which current and past time-series location and road information of a surrounding vehicle for three seconds are used as input values and a probability for the target lane of the surrounding vehicle is used as a result value may be used.

Figure 4:
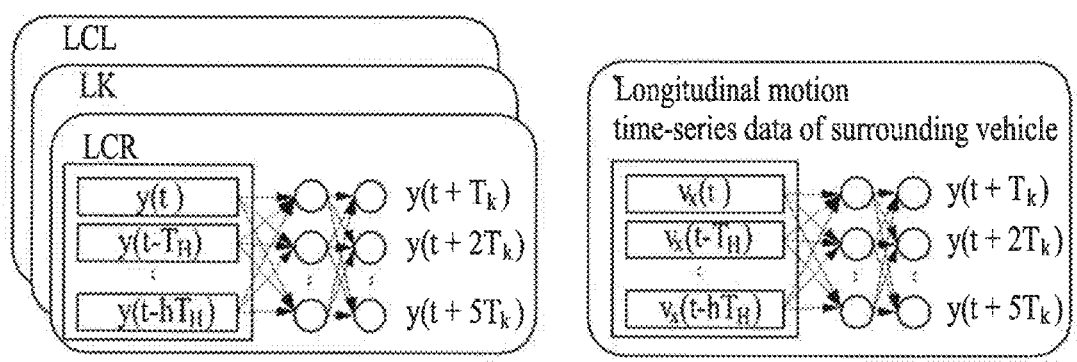
FIG. 4 is a diagram illustrating the structure of an artificial neural network for longitudinal and position driving trajectory prediction according to an embodiment of the present invention.

FIG. 4 is a diagram illustrating the structure of an artificial neural network for longitudinal and position driving trajectory prediction according to an embodiment of the present invention.

As shown in FIG. 4, an artificial neural network structure in which the current and past longitudinal locations of a surrounding vehicle for a predetermined time are used as a time-series input value and a future longitudinal location for a predetermined time is used as an output value may be used. According to an embodiment of the present invention, an artificial neural network structure for predicting a lane change and lane keeping of a surrounding vehicle through a probability of a target lane, and using current and past position locations for three seconds as a time-series input value and a future position location for five seconds as an output value with respect to each of a lane change and lane keeping as shown on the left of FIG. 4 is used.

Figure 5:
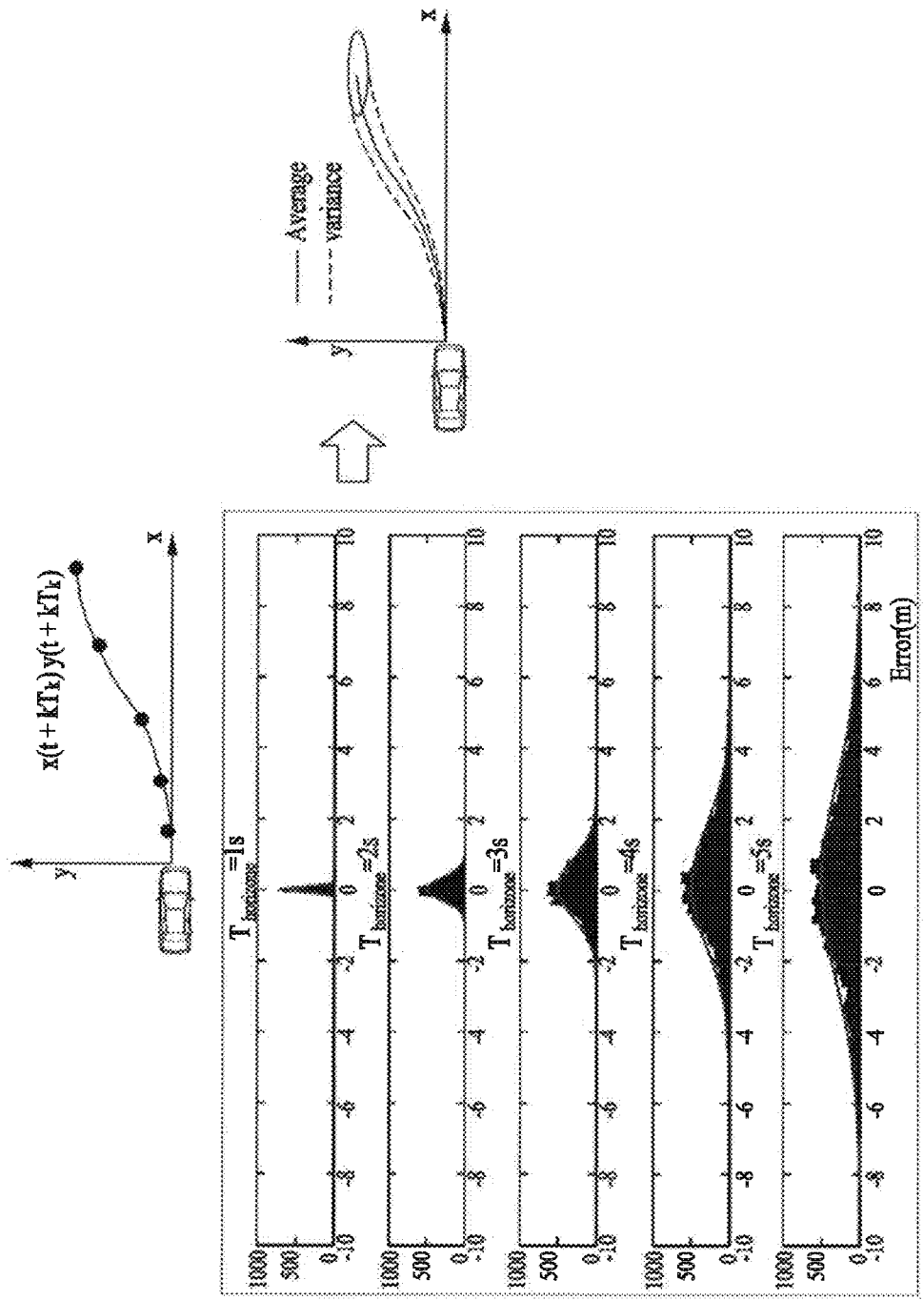
FIG. 5 is a diagram illustrating a driving trajectory prediction transform process in which uncertainty has been taken into consideration according to an embodiment of the present invention.

FIG. 5 is a diagram illustrating a driving trajectory prediction transform process in which uncertainty has been taken into consideration according to an embodiment of the present invention.

The trajectory of a surrounding vehicle is predicted based on a predicted location result value. As shown in FIG. 5, a probabilistic trajectory prediction result having given reliability may be derived through a process of probabilistically transforming a result value for a driving trajectory.

A lane change and lane keeping of a surrounding vehicle are predicted based on a probabilistic result value for a target lane. Furthermore, an artificial neural network structure in which current and past position locations for a predetermined time are used as a time-series input value and a future position location for a predetermined time is used as an output value with respect to each of the lane change and lane keeping of a surrounding vehicle may be used. Furthermore, the trajectory of the surrounding vehicle may be predicted based on a predicted longitudinal location result value. A result value for a driving trajectory may be transformed into a probabilistic result value.

Figure 6:
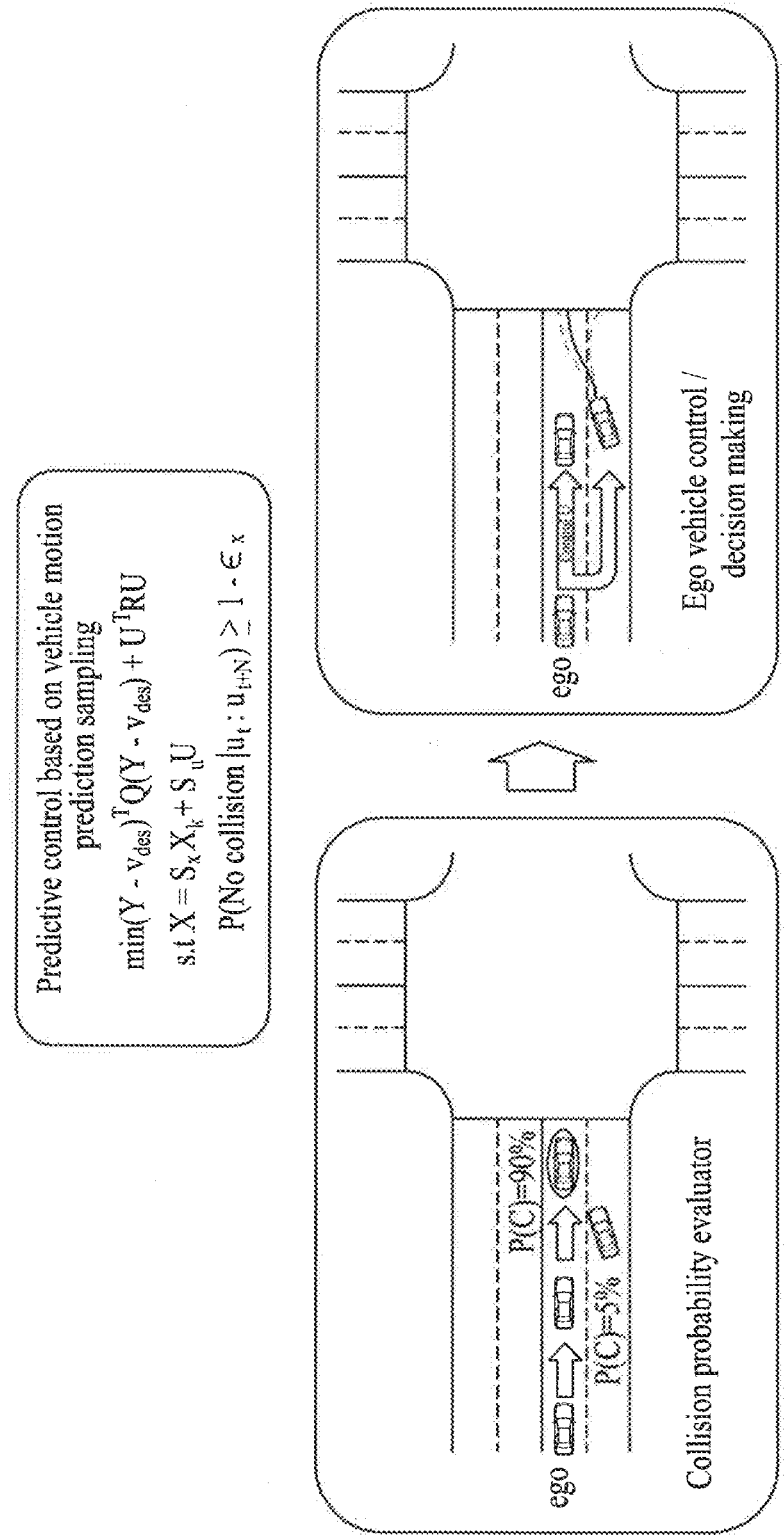
FIG. 6 is a diagram illustrating longitudinal control using model predictive control according to an embodiment of the present invention.

FIG. 6 is a diagram illustrating longitudinal control using model predictive control according to an embodiment of the present invention.

After a probabilistic motion of a surrounding vehicle is predicted using an artificial neural network scheme, collision avoidance longitudinal control may be performed through model predictive control using a probability of a collision likelihood as shown in FIG. 6.

After a probabilistic motion of a surrounding vehicle is predicted using an artificial neural network structure, longitudinal control for collision avoidance is performed using a probability of a collision likelihood. In this case, optimal longitudinal control is performed using a cost function that minimizes a difference between a longitudinal target velocity and a current velocity and target acceleration so that a collision probability does not exceed a predetermined value and the cost function is minimized.

Longitudinal control in which the uncertainty of a collision has been taken into consideration may be performed using longitudinal safety distance restriction between an ego vehicle and a surrounding vehicle in a chance-constraint form because probabilistic motion prediction for a motion of the surrounding vehicle is used. Furthermore, the desired driving style of the automated driving algorithm is adjusted by controlling a chance-constraint parameter.

FIG. 7 is an equation showing the definition of a cost function and a restriction condition for model predictive control according to an embodiment of the present invention.

In FIG. 7, Equation (1) is the cost function that minimizes a difference between a longitudinal target velocity and a current velocity and target acceleration. Optimal control is performed in such a way as to minimize the cost function.

In Equations (2), (3), (4), and (5) of FIG. 7, an acceleration range, an acceleration variation, and a collision probability in which the physical limit of a vehicle has been taken into consideration in minimizing the cost function may be used as restriction conditions.

Figure 8:
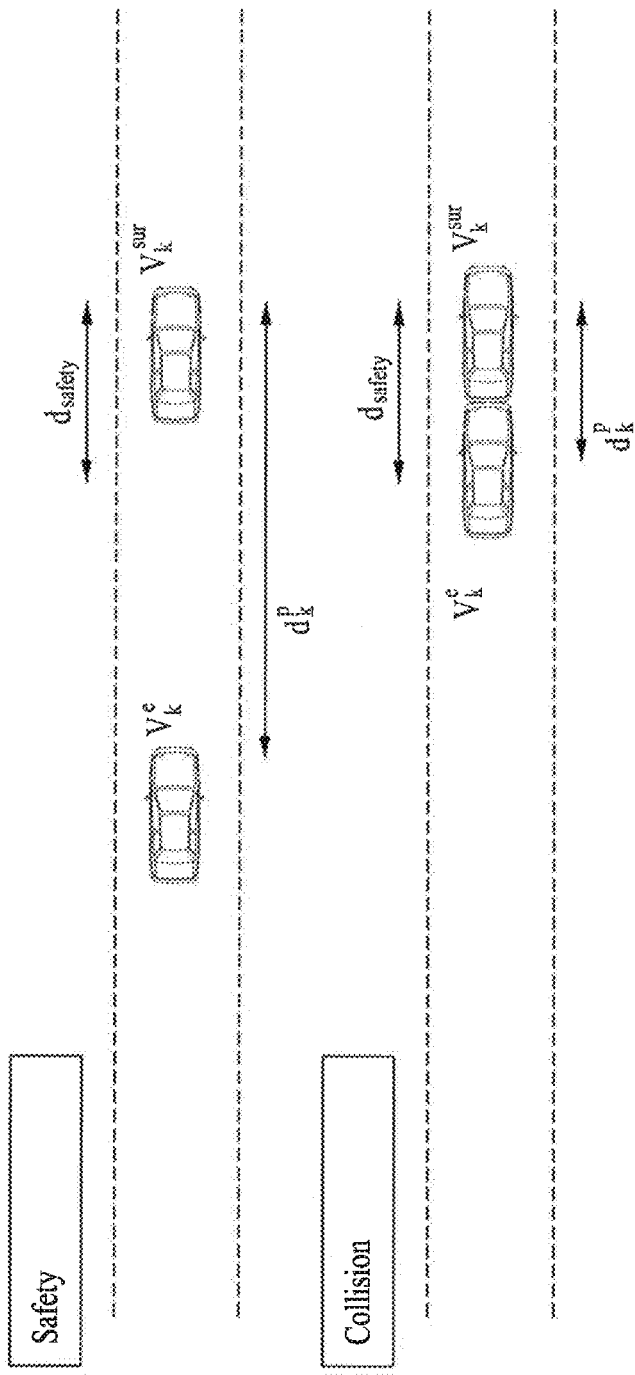
FIG. 8 is a diagram illustrating a safe condition and collision condition according to an embodiment of the present invention.

FIG. 8 is a diagram illustrating a safe condition and collision condition according to an embodiment of the present invention.

In Equation (5) of FIG. 7, as in FIG. 8, a result value of prediction for a motion of a surrounding vehicle is probabilistic. Accordingly, longitudinal control in which the uncertainty of a collision has been taken into consideration can be performed using longitudinal safety distance restriction between an ego vehicle and the surrounding vehicle in a chance-constraint form. The desired driving style of the automated driving algorithm is adjusted by controlling a chance-constraint parameter.

Figure 9:
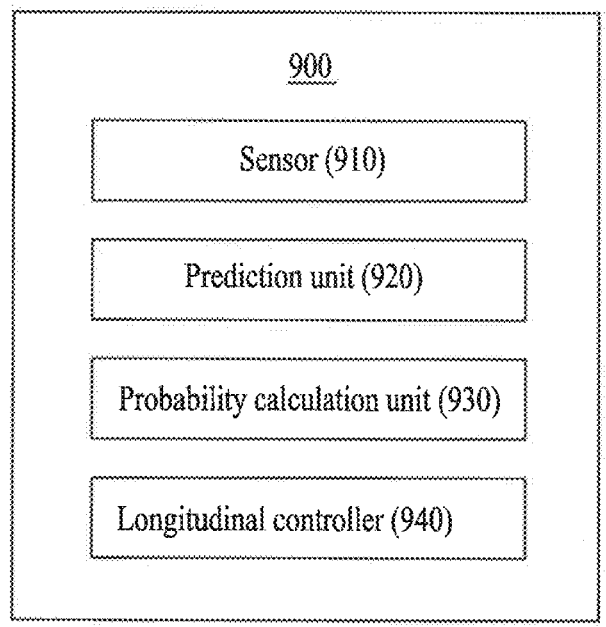
FIG. 9 is a diagram illustrating probabilistic prediction for a motion of a lane-based surrounding vehicle and the configuration of a longitudinal control apparatus using the same the same according to an embodiment of the present invention.

FIG. 9 is a diagram illustrating probabilistic prediction for a motion of a lane-based surrounding vehicle and the configuration of a longitudinal control apparatus using the same the same according to an embodiment of the present invention.

The proposed probabilistic prediction for a motion of a lane-based surrounding vehicle and a longitudinal control apparatus 900 using the same includes a sensor 910, a prediction unit 920, a probability calculation unit 930, and a longitudinal controller 940.

The sensor 910 obtains surrounding vehicle information.

The prediction unit 920 predicts a target lane of the surrounding vehicle based on the obtained surrounding vehicle information. In this case, an artificial neural network structure in which current and past time-series position information and road information of the surrounding vehicle for a predetermined time are used as input values may be used. Furthermore, a probability of the target lane is output as an output value.

The probability calculation unit 930 performs future driving trajectory prediction for each target lane using the obtained surrounding vehicle information. In this case, an artificial neural network structure in which the current and past time-series longitudinal/lateral positions and/or velocity of the surrounding vehicle for a predetermined time are used as input values based on a probability of the target lane is used. The longitudinal/lateral positions are output as an output value. In this process, different artificial neural networks are used for the longitudinal and position directions. Furthermore, a probability of the longitudinal/lateral positions is output as the final output value through a process of transforming the deterministic prediction output value into a probabilistic prediction output values.

The longitudinal controller 940 computes a probability of a collision likelihood using the target lane and trajectory predictions of the surrounding vehicle in which future uncertainty has been taken into consideration, and performs longitudinal control for collision avoidance. In this case, optimal longitudinal control is performed using the cost function that minimizes a difference between a longitudinal target velocity and a current velocity and target acceleration so that a collision probability does not exceed a predetermined value and the cost function is minimized.

Longitudinal control in which the uncertainty of a collision has been taken into consideration can be performed using longitudinal safety distance restriction between an ego vehicle and a surrounding vehicle in a chance-constraint form through probabilistic motion prediction for a motion of the surrounding vehicle. Furthermore, the desired driving style of the automated driving algorithm is adjusted by controlling a chance-constraint parameter.

A vehicle on a road runs along a highway lane or downtown lane with regularity. In the existing technologies, however, this is not properly taken into consideration because the lane-based model is not used. In contrast, the proposed method and apparatus can predict a motion of a lane-based surrounding vehicle using the location and velocity or current and past time-series location and velocity information of the surrounding vehicle as an input value.

The prediction of a motion of a surrounding vehicle through a deterministic method can never have accuracy of 100%. Accordingly, probabilistic prediction in which uncertainty has been taken into consideration is necessary.

In probabilistic motion prediction for a surrounding vehicle using an artificial neural network, the existing NN scheme solely estimates only a future location deterministically. In contrast, in an embodiment of the present invention, uncertainty is taken into consideration through probabilistic motion prediction. Furthermore, accuracy can be further improved using the past data as input value in addition to the current data.

In most of controllers, the uncertainty of prediction results may not be taken into consideration in restriction conditions. In the case of model predictive control using chance-constraint, a chance-constraint condition may express a collision likelihood using uncertainty included in a result value of prediction.

The present invention may be applied to an autonomous driving technology and driver assistance system for a vehicle. A current advanced driving system is not reliable due to low accuracy of prediction for a motion of a surrounding vehicle on a road. Accordingly, the present has been made keeping in mind that a vehicle must run on a lane according to rules, and probabilistically predicts a motion of a surrounding vehicle based on a lane using an artificial neural network. Accordingly, the present invention may be applied to driver assistance systems, such as SCC and AEB, in addition to the driving trajectory plan of an autonomous driving vehicle and a collision avoidance operation execution technology using a prediction result value including future uncertainty.

In the global vehicle field, autonomous driving technologies are actively developed according to the commercialization plan of autonomous driving. The vehicle field expects the commercialization year of an autonomous driving vehicle to be 2020. It is also expected that the importance of a surrounding vehicle prediction technology corresponding to the core technology of an autonomous driving vehicle will be increased.

Surrounding vehicle prediction is an essential part in the development of the autonomous driving technology. It is expected that probabilistic prediction for a motion of a surrounding vehicle will be used to develop all of autonomous driving vehicles because the probabilistic prediction has not reached reliability of 100% at this point in time.

It is expected that as the market of the autonomous driving technology increases, a core technology will be widely applied to all of autonomous driving technologies. Accordingly, it is expected that the proposed method and apparatus according to embodiments of the present invention can play an important role.

Furthermore, it is expected that the proposed method and apparatus may be applied to current driver assistance systems in addition to the autonomous driving technologies and thus can influence the entire vehicle industry.

The method and apparatus of the present invention may take a lead on the autonomous driving market through the development of a core technology for full autonomous driving. Accordingly, it is expected that the position of a local technology will rapidly rise in the economic and industrial aspects through technology export.

The above-described system or device may be implemented in the form of a combination of hardware components, software components and/or hardware components and software components. For example, the device and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processor may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may be aware that the processing device may include a plurality of processing elements and/or a plurality of types of processing elements. For example, the processing device may include a plurality of processors or a single processor and a single controller. Furthermore, other processing configurations, such as a parallel processor, are also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter.

As described above, although the embodiments have been described in connection with the limited embodiments and the drawings, those skilled in the art may modify and change the embodiments in various ways from the description. For example, proper results may be achieved although the above-described descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

According to the embodiments of the present invention, a target lane and trajectory predictions of a surrounding vehicle can be probabilistically predicted using probabilistic motion prediction in which uncertainty has been taken into consideration with respect to a motion of a surrounding vehicle, that is, an artificial neural network. Furthermore, a probability of a collision likelihood can be computed and longitudinal control for collision avoidance can be performed using a target lane and trajectory predictions of a surrounding vehicle in which uncertainty has been taken into consideration.

What is claimed is:

1. A method of predicting a motion of surrounding vehicles and controlling an ego vehicle, the method comprising:
    obtaining surrounding vehicle information using a sensor;
    predicting a target lane of the surrounding vehicle from a plurality of potential target lanes based on the obtained surrounding vehicle information, the plurality of potential target lanes being laterally adjacent to one another;
    performing future driving trajectory prediction for each of the plurality of potential target lanes including the predicted target lane based on the surrounding vehicle information; and
    computing a probability of a collision likelihood based on the target lane and trajectory predictions of the surrounding vehicle in which future uncertainty has been taken into consideration and performing longitudinal control for collision avoidance;
    wherein predicting the target lane of the surrounding vehicle includes using an artificial neural network structure in which current and past-time series position information of the surrounding vehicle and road information for a predetermined time are used as input values.

2. The method of claim 1, wherein predicting the target lane of the surrounding vehicle comprises:
    outputting a probability of the target lane as an output value.

3. The method of claim 2, wherein predicting the target lane of the surrounding vehicle is performed using Interacting Multiple Model, or Markov Chain in addition to an artificial neural network structure.

4. The method of claim 1, wherein performing the driving trajectory prediction comprises:
    using an artificial neural network structure in which current and past time-series longitudinal/lateral positions and/or velocity of the surrounding vehicle for a predetermined time are used as input values, and
    outputting longitudinal/lateral positions as an output value.

5. The method of claim 4, wherein performing the driving trajectory prediction is performed using Polynomial fitting using the artificial neural network position outputs.

6. The method of claim 4, wherein a probability of the longitudinal/lateral positions is output as a final output value through a process of transforming the deterministic prediction output values, output as the longitudinal/lateral positions, into a probabilistic prediction output values.

7. The method of claim 1, wherein computing the probability of the collision likelihood and performing the longitudinal control comprises:
performing optimal longitudinal control that minimizes a cost function, a difference between a longitudinal target velocity and a current velocity and target acceleration, while a collision probability does not exceed a predetermined value.

8. The method of claim 7, wherein:
longitudinal control in which uncertainty for a collision has been taken into consideration is performed using longitudinal safety distance restriction between an ego vehicle and the surrounding vehicle in a chance-constraint form through probabilistic motion prediction for a motion of the surrounding vehicle, and
a desired driving style of the automated driving algorithm is adjusted by controlling a chance-constraint parameter.

9. An apparatus for predicting a motion of a surrounding vehicle and controlling an ego vehicle, the apparatus comprising:
a sensor configured to obtain surrounding vehicle information using a sensor;
a prediction unit configured to predict a target lane of the surrounding vehicle from a plurality of potential target lanes based on the obtained surrounding vehicle information, the plurality of potential target lanes being laterally adjacent to one another;
a probability calculation unit configured to perform future driving trajectory prediction for each of the plurality of potential target lanes including the predicted target lane based on the surrounding vehicle information; and
a longitudinal controller configured to compute a probability of a collision likelihood based on the target lane and trajectory predictions of the surrounding vehicle in which future uncertainty has been taken into consideration and perform longitudinal control for collision avoidance;
wherein the prediction unit is configured to use an artificial neural network structure in which current and past time-series position information and road information of the surrounding vehicle for a predetermined time are used as input values.

10. The apparatus of claim 9, wherein the prediction unit is configured to:
output a probability of the target lane as an output value.

11. The apparatus of claim 9, wherein the probability calculation unit is configured to:
use an artificial neural network structure in which current and past time-series longitudinal/lateral positions and/or velocity of the surrounding vehicle for a predetermined time are used as input values, and
output longitudinal/lateral positions locations as an output value.

12. The apparatus of claim 9, wherein the longitudinal controller is configured to:
perform optimal longitudinal control using a cost function to minimize a difference between a longitudinal target velocity and a current velocity and target acceleration so that a collision probability does not exceed a predetermined value and the cost function is minimized.

13. A longitudinal control method using lane-based probabilistic prediction for a motion of a surrounding vehicle, the method comprising:
obtaining surrounding vehicle information using a sensor;
predicting a target lane of the surrounding vehicle from a plurality of potential target lanes based on the obtained surrounding vehicle information using an artificial neural network structure, the plurality of potential target lanes being laterally adjacent to one another;
performing future driving trajectory prediction for each of the plurality of potential target lanes including the predicted target lane based on the obtained surrounding vehicle information; and
computing a cost function to minimize a difference between a longitudinal target velocity and a current velocity and target acceleration using the predicted target lane and driving trajectory predictions of the surrounding vehicle and performing optimal longitudinal control so that a collision probability does not exceed a predetermined value and the cost function is minimized.

14. The method of claim 13, wherein:
longitudinal control in which uncertainty for a collision has been taken into consideration is performed using longitudinal safety distance restriction between an ego vehicle and the surrounding vehicle in a chance-constraint form through probabilistic motion prediction for a motion of the surrounding vehicle, and
a desired driving style of the automated driving algorithm is adjusted by controlling a chance-constraint parameter.

15. A longitudinal control apparatus, comprising:
a sensor configured to obtain surrounding vehicle information using a sensor;
a prediction unit configured to predict a target lane of the surrounding vehicle from a plurality of potential target lanes based on the obtained surrounding vehicle information using an artificial neural network structure, the plurality of potential target lanes being laterally adjacent to one another;
a probability calculation unit configured to perform future driving trajectory prediction for each of the plurality of potential target lanes including the predicted target lane based on the obtained surrounding vehicle information; and
a predicted target lane and driving trajectory predictions of the surrounding a longitudinal controller configured to compute a cost function to minimize a difference between a longitudinal target velocity and a current velocity and target acceleration using the predicted target lane and driving trajectory predictions of the surrounding vehicle and perform optimal longitudinal control so that a collision probability does not exceed a predetermined value and the cost function is minimized.

16. The apparatus of claim 15, wherein:
longitudinal control in which uncertainty for a collision has been taken into consideration is performed using longitudinal safety distance restriction between an ego vehicle and the surrounding vehicle in a chance-constraint form through probabilistic motion prediction for a motion of the surrounding vehicle, and
a desired driving style of the automated driving algorithm is adjusted by controlling a chance-constraint parameter.

* * * * *